(12) United States Patent
Moynihan

(10) Patent No.: US 10,795,046 B2
(45) Date of Patent: Oct. 6, 2020

(54) METHOD AND APPARATUS FOR SCANNING A CLOTHED HUMAN SUBJECT

(71) Applicant: Smiths Heimann GmbH, Wiesbaden (DE)

(72) Inventor: Colin Moynihan, Wiesbaden (DE)

(*) Notice: Subject to any disclaimer, the term of this patent is extended or adjusted under 35 U.S.C. 154(b) by 138 days.

(21) Appl. No.: 15/754,697

(22) PCT Filed: Aug. 25, 2016

(86) PCT No.: PCT/EP2016/070122
§ 371 (c)(1),
(2) Date: Feb. 23, 2018

(87) PCT Pub. No.: WO2017/032849
PCT Pub. Date: Mar. 2, 2017

(65) Prior Publication Data
US 2018/0246248 A1 Aug. 30, 2018

(30) Foreign Application Priority Data

Aug. 25, 2015 (GB) .................... 1515111.1

(51) Int. Cl.
*G01V 5/00* (2006.01)
*G01S 13/88* (2006.01)
*G01S 15/89* (2006.01)

(52) U.S. Cl.
CPC .......... *G01V 5/0033* (2013.01); *G01S 13/887* (2013.01); *G01S 15/89* (2013.01)

(58) Field of Classification Search
CPC ...... G01V 5/0033; G01S 13/887; G01S 15/89
See application file for complete search history.

(56) References Cited

U.S. PATENT DOCUMENTS 5,455,590 A * 10/1995 Collins ................. G01S 13/887
342/179
2003/0086525 A1* 5/2003 Rhee .................... G01S 13/887
378/63

(Continued)

FOREIGN PATENT DOCUMENTS

CN 103235346 A 8/2013
CN 203941303 U 11/2014

(Continued)

OTHER PUBLICATIONS

International Search Report dated Dec. 19, 2016 for PCT/EP2016/070122.

(Continued)

*Primary Examiner* — David P Porta
*Assistant Examiner* — Jeremy S Valentiner
(74) *Attorney, Agent, or Firm* — Kevin E. West; Advent, LLP

(57) ABSTRACT

A method of scanning a clothed human subject (14), the method comprising obtaining first scan data using a first scanner (10) by illuminating the subject with a first source of radiation adapted for scanning soft tissue surfaces hidden by the subject's clothing; and obtaining second scan data by illuminating the subject's torso with a second source of radiation (12-1) that is directed more towards the subject's torso than towards other parts of their body, wherein the second source of radiation comprises tissue penetrating radiation.

20 Claims, 2 Drawing Sheets

(56) References Cited

U.S. PATENT DOCUMENTS

| | | |
|---|---|---|
| 2006/0164285 A1 | 7/2006 | Fleisher |
| 2006/0203960 A1 | 9/2006 | Schlomka et al. |
| 2013/0039472 A1* | 2/2013 | Morton ............... G01V 5/0041 378/88 |
| 2014/0077988 A1* | 3/2014 | Saito ..................... G01S 7/41 342/27 |
| 2014/0341431 A1* | 11/2014 | Chen ..................... G01V 8/005 382/103 |
| 2016/0051211 A1* | 2/2016 | Linev .................. A61B 6/4405 378/62 |
| 2017/0010384 A1* | 1/2017 | Kreuzer ............. G01N 21/3581 |
| 2017/0017860 A1* | 1/2017 | Piatrou ................... G06K 9/48 |

FOREIGN PATENT DOCUMENTS

| | | |
|---|---|---|
| GB | 2490254 A | 10/2012 |
| WO | 9921148 A1 | 4/1999 |
| WO | 2016028617 A1 | 2/2016 |
| WO | 2017011022 A1 | 1/2017 |

OTHER PUBLICATIONS

Combined Search and Examination Report dated Jan. 25, 2016 for Appln. No. GB1515111.1.
Examination Report dated Feb. 12, 2018 for Appln. No. GB1515111.1.

\* cited by examiner

METHOD AND APPARATUS FOR SCANNING A CLOTHED HUMAN SUBJECT

FIELD OF INVENTION

The present disclosure relates to scanning apparatus and methods and to the detection of objects concealed by a living human or animal body, for example by imaging.

BACKGROUND

In correctional facilities and at national borders, there is a need to detect contraband such as weapons, narcotics, mobile telephones, and other objects. Objects may be concealed internally or externally, for example in clothing, in body cavities such as the mouth or anal canal, hidden in prosthetics such as artificial limbs, they may also be swallowed or even surgically implanted.

Detection of such contraband is necessary for law enforcement, and to maintain order in correctional facilities, and to control the transit of contraband across national borders. It has been proposed to use imaging techniques based on ionising radiation, such as transmission X-ray, to identify contraband hidden in the human or animal body.

Techniques such as transmission X-ray are advancing rapidly. Human and animal bodies can be inspected in their entirety, from head to toe, and even the smallest item of contraband may be identifiable—regardless of where it has been hidden.

It may therefore have been thought that there is no need to develop alternative techniques. Commonly held prejudice would suggest that the problem of detection of contraband has been conclusively solved.

The present application however identifies a hitherto unrecognised opportunity to advance conventional techniques.

SUMMARY OF INVENTION

Aspects and embodiments of the present disclosure, such as those set out in the appended claims, aim to address the above mentioned technical problem, and related technical problems.

BRIEF DESCRIPTION OF DRAWINGS

Aspects and embodiments of the disclosure will now be explained, by way of example only, with reference to the accompanying drawings, in which.

In the drawings like reference numerals are used to indicate like elements.

SPECIFIC DESCRIPTION

Figure 1A:
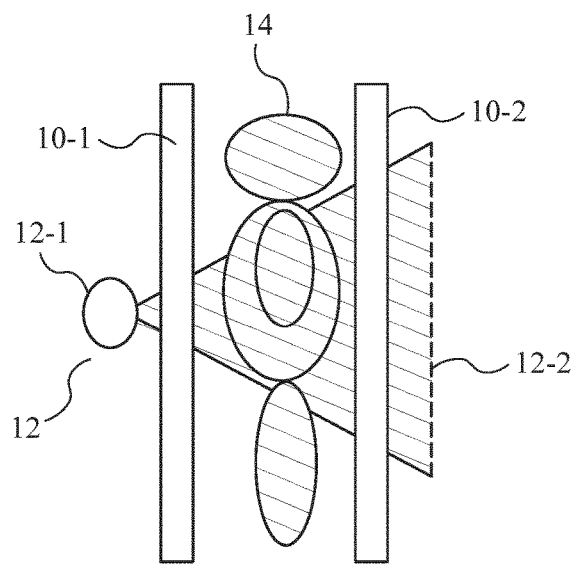
FIG. 1 shows an illustration of a scanning apparatus.
Figure 1B:
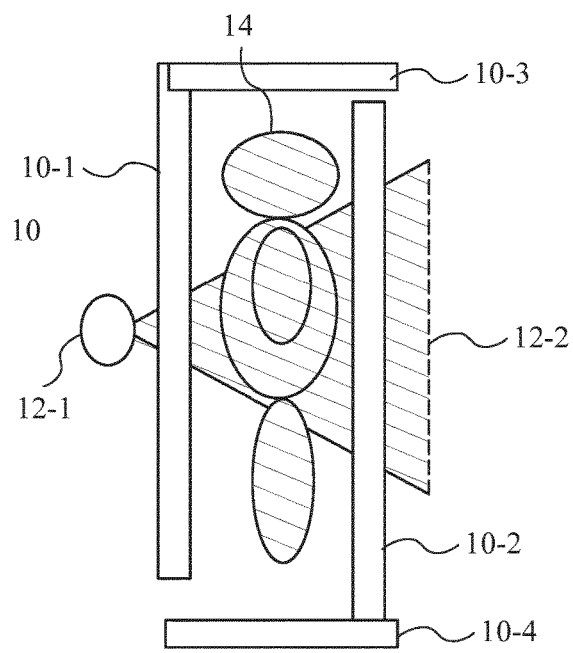
Figure 1B:
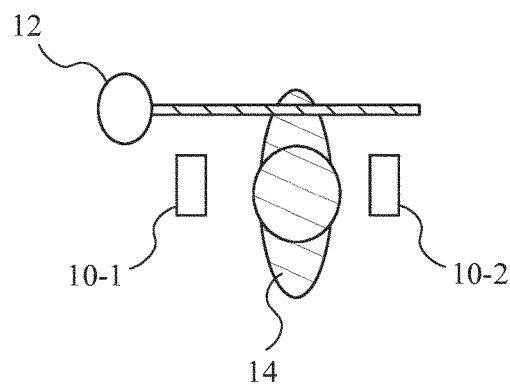

FIG. 1 shows a schematic illustration of a scanning apparatus. The apparatus illustrated in FIG. 1 comprises a first scanner 10 and a second scanner 12. The first scanner 10 is arranged to use a first radiation type to detect hidden objects concealed by a subject's clothing. It may also be operable to scan soft tissue surfaces, such as skin, hidden beneath the subject's clothing.

As illustrated, this apparatus also comprises a second scanner 12. The second scanner 12 comprises a second radiation provider 12-1 and a second radiation detector 12-2 and is arranged to use a second radiation type, such as tissue penetrating radiation to scan a subject. Data obtained by this scanning may be used to provide transmission image data of the interior of the same subject's torso. The second type of radiation is directed at the subject's torso more than at other parts of their body. For example their abdomen may be illuminated more than the rest of their body.

Embodiments of the disclosure may therefore provide better quality inspection of human subjects because they permit higher power tissue penetrating radiation to be used to detect objects in the torso than would otherwise be the case. Optimised optics may also be used to enable greater magnification to be provided—for example by placing the source of a fan beam closer to the subject while moving the detector relatively further away. The use of the first scanner 10 provides detection of objects concealed beneath clothing, and may enable surface irregularities to be detected. This information can then be combined with the transmission image data from their torso to provide sensitive, reliable, detection of non-tissue objects such as concealed contraband. Counterintuitively therefore, excluding body parts such as the limbs and head from exposure to the tissue penetrating radiation may provide more thorough inspection.

Methods and apparatus of the present disclosure may be arranged to shield at least a part of the subject's body from the second type of radiation. For example at least a part of the head and/or one or more of the limbs may be shielded from the second type of radiation. By contrast to the second type of radiation, the first type of radiation may illuminate most of the subject's body. For example it may illuminate one or more of their limbs at least partially, and may also illuminate their head. The first type of radiation may be delivered more evenly across the body than the second type of radiation. The first radiation type may comprise non-ionising radiation such as millimetre wave, terahertz, and infrared radiation. Other examples of non-ionising radiation include high frequency acoustic signals such as ultrasound.

In FIG. 1, there is illustrated an imaging region, which may be demarcated by a portal, sized to allow passage of an upright human adult. In FIG. 1, FIG. 1A shows a side view with the subject in profile standing in the imaging region. FIG. 1B shows the arrangement of FIG. 1A in plan.

The first scanner 10 of FIG. 1A includes a part 10-1 arranged to the front of the imaging region for scanning the face and front of the subject's body, and a part 10-2 arranged to the rear of the imaging region for scanning the back of the subject's body. Each part 10-1, 10-2 includes radiation providers and radiation detectors, for example transmit/receive antennae. The second scanner 12 is different in that the radiation provider 12-1 and the radiation detector 12-2 are separated by the imaging region. This enables the second scanner to scan the imaging region by passing radiation from the second radiation provider 12-1, through the subject 14 to the second radiation detector 12-2.

Accordingly, in the example shown in FIG. 1, the first scanner 10 includes a front view part 10-1 comprising a first radiation provider and first radiation detector arranged to scan the front of the subject's body. It also comprises a back view part 10-2 also having a first radiation provider and first radiation detector arranged to scan the back of the subject's body as the subject 14 stands in the imaging region. The first radiation provider and the first radiation detector may be provided by transmitting and receiving antennae that are tuned to receive and transmit the first radiation type, for example mm-wave antennae. The first scanner 10 shown in FIG. 1 comprises an elongate linear array of such transmitting and receiving antennae. The front view part 10-1 may comprise one such linear array provided in front of the subject's body to provide a front view, while the rear view part 10-2 may be provided by another such array behind the subject's body.

In the arrangement illustrated in FIG. 1, each array spans the height of the subject's body, from the floor of the imaging region to at least the height of the subject's head. In FIG. 1 each linear array is arranged in a straight vertical line. It can be seen in FIG. 1B that these arrays of the first scanner 10 define an imaging plane. Relative movement of this imaging plane with respect to the subject 14 can enable the subject's body to be scanned with the first radiation type. The first scanner 10 is thereby arranged so that first scan data can be collected from most, for example, all areas of the subject's body in the imaging region. This can enable first image data, showing these areas of the subject's body, to be reconstructed from the scan data.

As mentioned above, the first radiation provider may comprise a plurality of sources of the first radiation type and these sources may be spaced apart to provide an array. As mentioned, they may be arranged in a linear array, which may be at least partially upright. In contrast to the second radiation type, this array may be arranged to deliver the first radiation type in an even distribution of energy density across the imaging region. For example the energy density of the first radiation type may be distributed in a manner that is at least partially homogeneous for example completely homogeneous.

The first scanner 10 comprises a first radiation detector arranged to detect radiation after it has interacted with, for example been reflected, by the subject's body. It will be appreciated in the context of the present disclosure that the spatial and/or temporal distribution of signal intensity of this scattered radiation can be used to scan the subject's body. The scan data need not be reconstructed into an image in the conventional sense that a human operator might recognise—for example features of the scan data (for example signal intensity or Fourier domain features) may be used instead without the need to reconstruct a complete image. The scan data may of course however be used to assemble an image of the subject's body. Such images may be three dimensional. One way to achieve this is to use synthetic aperture reconstruction. Other image reconstruction techniques will be apparent to the skilled person in the context of the present disclosure.

FIG. 1A also shows a second scanner that comprises a second radiation provider and a second radiation detector. As noted above, the second scanner 12 is arranged slightly differently from the first scanner 10 in that its radiation provider 12-1 and radiation detector 12-2 are separated from each other by the imaging region. This enables it to generate a transmission image of the subject 14—for example tissue penetrating radiation can be passed through the subject 14 to obtain an image of the subject 14. This image may indicate spatial variations in density, or transmissivity, of the subject 14. For example it may comprise a transmission X-ray image.

FIG. 1A illustrates an arrangement in which the second radiation provider 12-1 is arranged to illuminate the subject 14 with a thin fan beam of tissue penetrating radiation. The second radiation detector 12-2 comprises a line of detectors on the other side of the imaging region from the second radiation provider 12-1. This can enable an image of the subject's body to be assembled based on the transmission of the fan beam of radiation through the subject's body. It can be seen in FIG. 1B that the fan beam of the second type of radiation may be collimated so that it is of tightly constrained horizontal width (transverse to the beam direction) but fans out vertically. Generally the horizontal width of this beam is less than 20 mm, for example less than 10 mm. The width of the beam is selected so that the spread of the beam at the detector matches the width of the detector.

The plane of illumination defined by this fan beam, and the detector line of the second radiation detector may be offset from the imaging plane of the first scanner 10. For example the two imaging planes may be offset (spaced apart) in a direction that is transverse to both planes. The first scanner 10 may thereby be arranged so that it does not obstruct the line of sight between the second radiation source and the second radiation detector.

In the example illustrated in FIG. 1, the radiation provider of this second scanner 12 is arranged to illuminate only a selected part (e.g. less than all) of the imaging region. In some cases however the field of view may encompass the entire field of view—for example to allow imaging of the subject's entire body. The selected part is arranged to correspond to the position of the torso of an upright human adult 14 standing in the imaging region. The selected part may have a vertical extent of between 30 cm and 100 cm, for example between 40 cm and 60 cm in the imaging region. For example it may extend about 50 cm upward from a point at the bottom of the subject's abdomen. For example the lower edge of the illuminated area may be selected to be at least lower than the subject's anal canal, and at least higher than a midpoint of their thighs, for example at least higher than their knees. In some embodiments the height and/or the vertical extent of the field of view of the second scanner may be adjustable. For example, embodiments of the disclosure may be configured to obtain an image of the subject using the first scanner and to adjust the field of view of the second scanner based on the image of the body obtained using the first scanner.

In the example illustrated in FIG. 1 the second radiation provider 12-1 comprises an X-ray fan beam provider. The second radiation provider 12-1 is arranged so that the second radiation type illuminates this selected part of the imaging region in more strongly than other parts of the imaging region. For example, the field illuminated by the fan beam may be restricted to this selected area. Other parts of the imaging region may be shielded from the second radiation type. This may be accomplished by directing the fan beam only at this area and/or by attenuating the second type of radiation that might otherwise reach parts of the imaging region. For example a radio opaque shield may be arranged to shield other parts of the imaging region from direct exposure to radiation from the second radiation provider.

Figure 1C:
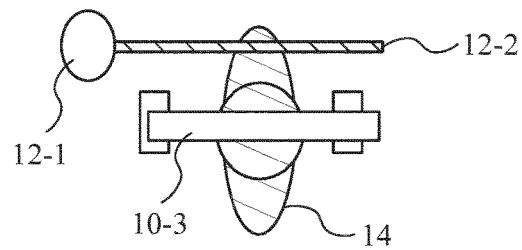

FIG. 1C illustrates a side view of an apparatus in which the first scanner 10 comprises an array 10-3 that is arranged for inspection of upward facing surfaces and another 10-4 that is arranged for the inspection of downward facing surfaces of the subject's body. For example, the array(s) of front view system and/or back view system may comprise one or more horizontal arrays. As shown in FIG. 1C, one such horizontal array may be arranged for imaging the bottom of the subject's feet. As illustrated in FIG. 1C a horizontal array may be arranged for imaging upward facing surfaces of the subject's body such as the top of their head. In the example of FIG. 1C the upright and horizontal parts of the arrays are shown as being perpendicular, but this is merely an example. They may also comprise one or more arrays arranged in a non-upright, non-horizontal orientation. The arrays may also be curved.

Accordingly, in embodiments such as those described above with reference to FIG. 1, the first type of radiation may be directed towards the subject 14 from a plurality of spatial positions that are distributed around the imaging region. The first scanner 10 itself may be scanned across the subject's body. In some possibilities it may also be scanned in a trajectory that surrounds the subject's body, for example along a circular scan path, while the subject 14 remains stationary. It will also be appreciated however that the subject 14 can be moved while the imagers remain stationary. One way to achieve this is to provide a moving support surface for the subject 14 to stand on, such as a conveyor or rotatable turntable. Accordingly, in some embodiments the apparatus comprises a moving support surface that is arranged to move the subject 14 relative to the fan beam of the second radiation type and relative to the field of view of the first scanner 10.

It will be appreciated in the context of the present disclosure that a subject may be scanned to obtain image data (e.g. data from which an image could be reconstructed) without the need to reconstruct that image for display to a human operator. For example spatial frequency data, texture data, or other image parameters may be derived from image data obtained from a scan and used to detect objects. In other words—information about the subject may be inferred from the scan without the need to reconstruct a human interpretable image.

It will also be appreciated that although FIG. 1A is described in terms of an active imager e.g. it comprises its own radiation provider, passive imaging systems may also be used. FIG. 1-A shows a first scanner which includes two parts, front 10-1 and rear 10-2, only one such part is needed, but in some cases more parts may be used—for example further parts may be arranged for imaging the sides, upper and lower facing surfaces of the subject.

Figure 2:
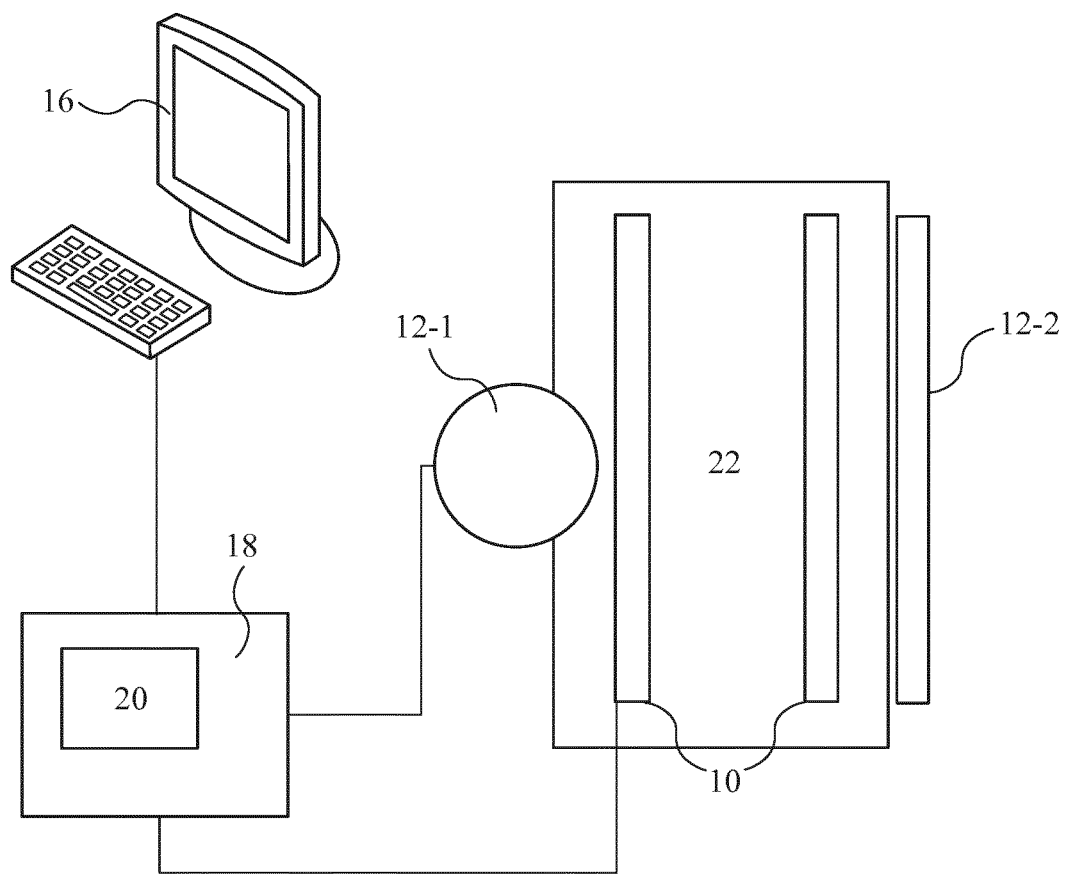
FIG. 2 shows another illustration of scanning apparatus.

FIG. 2 shows a scanning apparatus comprising a first scanner 10, a second scanner 12, a controller 18, and an operator interface 16. The first scanner 10 and the second scanner 12 are coupled to a movable support structure 22 which holds them at selected positions for scanning an imaging region which can be occupied by a human subject 14. Each of the first scanner and the second scanner may comprise imaging hardware and/or software adapted to provide image data based on the scan data acquired from scanning the subject.

The controller 18 is coupled to the first scanner 10 and the second scanner 12, and to the operator interface 16.

The operator interface 16 comprises a display for showing images and for communicating information to a human operator. It may also comprise a human input interface for allowing the operator to provide commands to the controller 18, for example for controlling the display and/or first scanner 10 and the second scanner 12.

The controller 18 comprises processing logic adapted for processing signals from the imagers to reconstruct images, and for manipulating the images for display by the operator interface 16. The controller 18 also comprises a machine readable data store 20.

The data store 20 may be configured to store position data based on the position of the first scanner 10 relative to the second scanner. The position data may comprise a transformation, such as an affine transform, adapted for transforming image data based on the scan acquired by the first scanner 10 and image data based on the scan acquired by the second scanner into a common frame of reference—for example this transformation may be configured to co-register the two types of image data.

The data store 20 may also be configured to store comparator data, such as comparator scan data and comparator image data—for example scan or image signatures associated with the presence of concealed objects. For each image signature, the comparator data may comprise comparator data for the first image type (surface images) and comparator data for the second image type (transmission images). Image signatures in the first image type may comprise things such as image data associated with phase lines, image data associated with a flat surface, image data associated with a straight edge, image data associated with an angular feature, and image data associated with one or more different types of non-tissue objects. Image signatures in the second image type may comprise thresholds of transmissivity, for example an image density threshold associated with a plastic or metal object, for example geometric shapes. The comparator data may also comprise expected anatomical data. Embodiments of the disclosure may be configured to compare image data obtained from a subject with the comparator data to detect anomalies, and to trigger an alert in the event based on this comparison.

The first scanner 10 comprises a front view system and a back view system having the features described above with reference to FIG. 1. Likewise, the second scanner comprises a second radiation provider and a second radiation detector. The second radiation provider and the second radiation detector are separated from each other by an imaging region in which a human subject 14 can be placed. The second scanner is adapted for scanning the subject's torso as explained above. Also as described above, the first scanner 10 is adapted for providing images of the surface of most of the subject's body. As explained above, the first source of radiation comprises non-ionising radiation, and the second source of radiation comprises tissue penetrating radiation.

In operation, a human subject 14 stands in the imaging region, and the controller 18 controls the movable support structure 22 to move the first scanner 10 and the second scanner 12 to scan the subject 14 with the first type of radiation and the second type of radiation.

The first scanner 10 then provides the first image data to the controller 18. The first image data comprises a front view of the subject 14 and a back view of the subject 14 each view showing surfaces, such as soft tissue and concealed objects, hidden by the subject's clothing. The second scanner 12 also provides the second image data which may show an image based on the transmissivity of a restricted part of the subject's body, such as their torso as explained above. This may exclude at least one of a head and a limb of the subject. The first image data however shows the torso of the subject and at least one of their head and one of their limbs. The second scanner may obtain the second image data simultaneously with the first scanner, or at another time, for example before or after the first image data is obtained.

The controller 18 then takes this image data and applies the transformation based on the relative positions of the first scanner 10 and the second scanner 12 to co-register the front view and/or the second view of the subject's body surfaces with the transmission image of their torso.

The controller 18 can then provide a composite image based on the two different types of image data for display by the operator interface 16. This composite image may comprise a side-by-side display of the different image types—for example the first image data (the subject shown head to foot) may be displayed adjacent to the second image data showing their torso. As a result of the co-registration the vertical height of the torso image may be adjusted so that the two images can be easily compared by the operator.

The controller 18 can also then compare at least one of the first image data and the second image data with the stored comparator data for that image type. These comparisons may be performed according to a pattern matching algorithm.

In the event that a feature in the first or second image data matches one of the stored items of comparator data, or indicates an anomaly from a normal reference (such as anatomical reference data) the controller 18 may be configured to indicate that a closer inspection should be performed. This may be done by triggering an audible or visible alert. This visible alert may comprise indicating the location of a corresponding region in the other of the first or second image data, for example by highlighting that region, for example by providing a boundary around it on the display of the operator interface 16.

The controller 18 may also be configured to overlay the first image data and the second image data. This may be done by making at least one of the two types of image appear to be at least partially transparent. Different overlays can be provided. For example the front view can be overlaid with the transmission image, and the back view can be overlaid with the transmission image. The controller 18 may be configured to display a sequence of different images. For example one of the front view and the back view may be displayed, followed by a display of the transmission image at the same spatial location on the display. This may help the operator to visually identify regions of the transmission image which show unusually high density due to some kind of surface feature, such as an object which may be concealed beneath the subject's clothing. The different overlays may also be interleaved in this sequence. The sequence may be predetermined, or the controller 18 and operator interface 16 may be configured to allow an operator to select which image to show next at the same spatial location on the display.

The first radiation provider comprises a source of non-ionising radiation. A suitable wave length range of the non ionising radiation is from 10 GHz to 500 THz, for example between 15 GHz and 450 GHz, for example between 20 GHz and 400 THz, for example mm-wave radiation from 18 to 27 GHz, and also 77 GHz, also 96 GHz and higher, for example the J/K bands. Infrared radiation in the frequency range of 300 GHz to 430 THz may also be used.

The second radiation provider may comprise a generator of tissue penetrating radiation such as a linear accelerator or microwave excited X-ray source. The energy of the tissue penetrating radiation may be in the range of 50 keV to 160 keV. For example, to provide an energy range of 50 keV to 160 keV a tube based X-ray generator may be used, such as in the B-SCAN 16HR-LD range of transmission X-ray scanners, which are available from Smiths Group plc. 459 Park Avenue, Bushey, Watford, Hertfordshire, WD23 2BW. In some embodiments the second radiation provider may comprise a dual band X-ray source. In some embodiments the second radiation provider comprises a passive source of tissue penetrating radiation such as a radioactive isotope that provides a gamma ray source. The second radiation provider may for example comprise a wave guide for obtaining radiation from such a radiation source and a collimator for providing a beam of radiation for illuminating the subject's torso. The second radiation provider therefore need not actually comprise the source of radiation itself—it need only be able to direct the second type of radiation in the manner needed to provide transmission images as described above. The generator may be made and sold separately.

In some embodiments the tissue penetrating radiation may be non-ionising. For example radio frequency radiation may be used. In these embodiments NMR based techniques may be used to scan the subject. Such techniques could involve the application of a magnetic field to the body, or may be based on low field NMR/MRI techniques.

To the extent that the imaging methods described herein may be applied to the living human or animal body, it will be appreciated that such methods may not provide any surgical or therapeutic effect. In addition, it will be appreciated that such methods may be applied ex vivo, to tissue samples that are not part of the living human or animal body. For example, the methods described herein may be practiced on meat, tissue samples, cadavers, and other non-living objects.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments.

The discussion above has mentioned the use of at least two linear arrays for the first scanner 10, but it will be appreciated that three, four or more linear arrays may be used. These may provide more coverage of the person. e.g. front, back, top (head and shoulders) and bottom (e.g. under their feet). Multiple linear arrays may also be provided, and offset from each other to enable the person to be scanned as they stand still, and without moving the array. For example one or both of the front view imaging system and the back view system of the first scanner may comprise a 2D array. For example a phased array may be used to scan the back of the person and another phased array may be used to scan the front of the person. As will be appreciated in the context of the present disclosure, a phased array antenna may be composed of lots of radiating elements each phase shifted from the other. By control of the phase shift constructive/destructive interference effects can be used to steer the beam in the desired direction. Different patterns can be used to focus the beam on different voxels. Examples of systems suitable for use as a first scanner include the eqo (RTM) active millimetre-wave scanner available from Smiths Detection.

The second scanner 12 generally comprises a transmission X-ray scanner. Suitable classes of X-ray scanner include single energy transmission x-ray line scanner.

It has been explained above that in some circumstances, the torso scan configuration of this second scanner 12 is of particular utility. However in some embodiments, rather than being set to only image the torso the second scanner 12 may have an adjustable field of view. For example the vertical spatial extent of the fan beam may be adjustable. For example the lowest and or highest boundary of the field of illumination of the second radiation type may be adjustable to allow the height of the illuminated region to be adjusted. A full body configuration may also be used in which the second scanner 12 is configured to obtain a transmission image that includes one or more limbs and/or the head of the subject. For example it may be arrangeable to obtain a single image of the entire body.

It will be appreciated that a multiple view system may also be used. For example, more than one x-ray imager can be used to provide the second scanner. For example one full body view system, and a second torso view system, or 2 torso views at different angles to give more information about the subject, or about the shape of a concealed object. Viewing angles for these systems could be 0° and 30°.

The second scanner 12 may be configured to provide a fixed dose of the second radiation type per inspection. It may also be configured to provide a switchable/variable dose per inspection.

The second scanner 12 may also be positioned so that the subject can face the second radiation provider, or can face away from it.

It has been explained above that the imagers may remain stationary and the subject may be moved past the sensors. For example on a conveyor system. Alternatively, the person may stand still while they are scanned—either electronic scanning or mechanical scanning may be used. As will be appreciated in the context of the present disclosure electronic scanning may comprise controlling a phased array to electronically steer a beam.

The two imagers may also be used in combination with other, additional, sensors and identifiers for uniquely identifying the subject. These may comprise identifiers based on machine readable markers such as barcodes or identity cards. Biometric identifiers such as fingerprints may also be used. The apparatus may comprise a camera, such as a video camera to record the scan, or simply to capture a picture of the person who is being scanned.

It will also be appreciated by the skilled addressee in the context of the present disclosure that the operator of the apparatus may be present when the scan takes place—for example they may be in the same facility, for example in the same building, in the same room or an adjacent room. There could be one or more operators. The operator function could be combined—a single operator may both start the scan and evaluate the scan. In some embodiments the operator function could be split—a first operator may start the scan, and a second operator may evaluate the scan.

The system could produce results in a number of different ways. The system could produce static images from each of the sensors. e.g. a transmission x-ray image and front and back millimetre wave images. The system could produce a combined image using data from the transmission x-ray scan and the millimetre wave scan to produce a combined image. Images could be displayed side by side or stacked/layered. The system could provide a moving image/video of the person as they pass through the system or a collection of images from different views. The operator could mark an area on one of the images and the corresponding area would be marked on the other images to help the operator to evaluate the images.

A hybrid image could be provided to the operator to help them to evaluation the image. For example different colours could be used to show front, back and internal anomalies. The operator could be provided with software tool to assist them evaluating the images. For example by highlighting areas that have a high density. The system could use automatic detection software to provide results about the image—e.g. clear result or anomaly result. For example, the system may be configured to identify a symmetry property of a subject, for example differences between the left side and right side of their body and any deviations from such symmetry.

Alarms could be placed on the raw images or on a generic mannequin image.

Other examples, further refinements, generalisations, and variations of this disclosure are contemplated. The present scope of the disclosure is defined by the appended claims.

The invention claimed is:

1. A method of scanning a clothed human subject, the method comprising:
   obtaining first scan data using a first scanner by illuminating a clothed human subject with a first source of radiation adapted for scanning soft human tissue surfaces hidden by clothing of the clothed human subject, wherein the first source of radiation comprises non-ionising radiation;
   obtaining second scan data by illuminating the clothed human subject's torso with a second source of radiation that is directed towards the torso of the clothed human subject in preference to other parts of the body of the clothed human subject, wherein the second source of radiation comprises tissue penetrating radiation;
   obtaining at least one of first image data based on the first scan data or second image data based on the second scan data; and
   indicating a body region shown in the second image data based on a feature of the first image data, the feature of the first image data including at least one of a contrast, a reflectivity, an absorbance, an edge feature, or a phase line.

2. The method of claim 1, wherein a field of illumination of the second source of radiation excludes at least one of a head of the clothed human subject or a limb of the clothed human subject.

3. The method of claim 1, wherein the first scan data comprises data obtained from scanning the torso of the clothed human subject and at least one of the head of the clothed human subject or one of the limbs of the clothed human subject.

4. The method of claim 1, further comprising identifying a feature in the first scan data by comparing the first scan data with comparator data.

5. The method of claim 4, wherein the comparator data comprises reference data associated with the clothed human subject.

6. The method of claim 5, wherein the reference data comprises at least one of stored image data obtained from the clothed human subject or an anatomical reference associated with a normal human body.

7. The method of claim 1, further comprising providing a composite image based on the first image data and the second image data.

8. The method of claim 1, further comprising providing an indication to an operator based on a symmetry property of the clothed human subject based on at least one of the first image data or the second image data.

9. The method of claim 1, further comprising co-registering the first image data and the second image data based on transform data indicating a spatial relationship between the first scanner and the second scanner.

10. The method of claim 1, wherein the non-ionising radiation is in a wavelength range of 10 GHz to 500 THz.

11. A scanning apparatus for scanning a clothed subject, the apparatus comprising:
a first scanner configured to scan surfaces hidden by clothing of a clothed subject and generate first scan data, the first scanner comprising a source of non-ionising radiation;
a second scanner configured to scan internal structures of the body of the clothed subject and generate second scan data, the second scanner comprising a source of tissue penetrating radiation arranged to provide radiation to the torso of the clothed subject in preference to the head and limbs of the clothed subject; and
a controller operably coupled to the first scanner and the second scanner, the controller configured to:
receive at least one of the first scan data or the second scan data from the first scanner and the second scanner, respectively;
obtain at least one of first image data based on the first scan data or second image data based on the second scan data; and
indicate a body region shown in the second image data based on a feature of the first image data, the feature of the first image data including at least one of a contrast, a reflectivity, an absorbance, an edge feature, or a phase line.

12. The apparatus of claim 11, further comprising a support structure adapted to hold the first scanner and the second scanner in position for scanning an upright adult human subject.

13. The apparatus of claim 11, further comprising a beam shaper arranged to shield at least one of a head or torso of the clothed subject from the tissue penetrating radiation.

14. The apparatus of claim 11, wherein the second scanner comprises an imager.

15. The apparatus of claim 11, wherein a field of view of the first scanner is offset from a field of view of the second scanner.

16. The apparatus of claim 11, wherein the first scanner and the second scanner are coupled to a rigid support structure adapted to provide a selected spatial relationship between the first scanner and the second scanner.

17. The apparatus of claim 16, wherein the controller is adapted to transform at least one of the scan of surfaces hidden by the clothing of the clothed subject or the scan of internal structure of the body of the clothed subject, based on the selected spatial relationship to provide at least one transformed image.

18. The apparatus of claim 11, wherein the first scanner includes at least two elongate linear array of transmitting and receiving antennae, each of the at least two elongate linear array of transmitting and receiving antennae tuned to receive and transmit non-ionising radiation.

19. A method of scanning a clothed human subject, the method comprising:
obtaining first scan data using a first scanner by illuminating a clothed human subject with a first source of radiation adapted for scanning soft human tissue surfaces hidden by clothing of the clothed human subject, wherein the first source of radiation comprises non-ionising radiation;
obtaining second scan data by illuminating the clothed human subject's torso with a second source of radiation that is directed towards the torso of the clothed human subject in preference to other parts of the body of the clothed human subject, wherein the second source of radiation comprises tissue penetrating radiation;
obtaining at least one of first image data based on the first scan data or second image data based on the second scan data; and
providing an indication to an operator based on a symmetry property of the clothed human subject based on at least one of the first image data or the second image data.

20. The method of claim 19, further comprising providing a composite image based on the first image data and the second image data.

* * * * *